United States Patent
Coon et al.

(10) Patent No.: US 10,705,109 B2
(45) Date of Patent: Jul. 7, 2020

(54) WINDSOCK ASSEMBLY WITH A LIGHTING UNIT

(71) Applicants: Richard Coon, Pinellas Park, FL (US); Lori Coon, Pinellas Park, FL (US)

(72) Inventors: Richard Coon, Pinellas Park, FL (US); Lori Coon, Pinellas Park, FL (US)

( * ) Notice: Subject to any disclaimer, the term of this patent is extended or adjusted under 35 U.S.C. 154(b) by 181 days.

(21) Appl. No.: 15/946,750

(22) Filed: Apr. 6, 2018

(65) Prior Publication Data

US 2019/0310282 A1    Oct. 10, 2019

(51) Int. Cl.
| | | |
|---|---|---|
| *G01P 13/02* | (2006.01) | |
| *B60Q 1/26* | (2006.01) | |
| *G01P 13/00* | (2006.01) | |
| *H01Q 1/32* | (2006.01) | |
| *H01Q 1/12* | (2006.01) | |
| *B60R 16/033* | (2006.01) | |

(52) U.S. Cl.
CPC ........... *G01P 13/02* (2013.01); *B60Q 1/2611* (2013.01); *G01P 13/0013* (2013.01); *H01Q 1/3275* (2013.01); *B60R 16/033* (2013.01); *B60Y 2400/216* (2013.01); *H01Q 1/1214* (2013.01)

(58) Field of Classification Search
None
See application file for complete search history.

(56) References Cited

U.S. PATENT DOCUMENTS

| 4,901,662 | A | 2/1990 | Sandeen et al. | |
|---|---|---|---|---|
| D368,866 | S | 4/1996 | Smith | |
| 6,769,951 | B2 | 8/2004 | Collier | |
| 8,091,420 | B2* | 1/2012 | Al Wehebi | G01P 13/02 |
| | | | | 73/170.01 |
| 8,959,992 | B1* | 2/2015 | Murdoch | G01P 13/045 |
| | | | | 73/170.01 |
| 9,709,036 | B2* | 7/2017 | Skelton | G09F 21/04 |
| 2005/0279403 | A1* | 12/2005 | Kube | G09F 19/02 |
| | | | | 136/244 |
| 2009/0013571 | A1* | 1/2009 | Edmonds | G09F 21/04 |
| | | | | 40/564 |
| 2009/0140940 | A1 | 6/2009 | Giesbrecht | |
| 2010/0212199 | A1* | 8/2010 | Edmonds | G09F 21/04 |
| | | | | 40/581 |
| 2014/0366623 | A1* | 12/2014 | Anderson | G01P 5/02 |
| | | | | 73/170.06 |
| 2015/0096364 | A1* | 4/2015 | Di Giovine | G01P 13/02 |
| | | | | 73/170.06 |
| 2017/0067444 | A1 | 3/2017 | Skelton | |

* cited by examiner

*Primary Examiner* — Natalie Huls
*Assistant Examiner* — Jermaine L Jenkins

(57) ABSTRACT

A windsock assembly for indicating a direction of wind includes a base that is mountable on a roof of a vehicle. An antenna is pivotally coupled to and extends upwardly from the base. A windsock is coupled to the antenna such that the windsock is exposed to wind to indicate a direction of the wind. A lighting unit is coupled to the antenna and the lighting unit emitting light outwardly from the antenna when the lighting unit is turned for illuminating an area proximate the antenna.

8 Claims, 5 Drawing Sheets

10,705,109 B2

WINDSOCK ASSEMBLY WITH A LIGHTING UNIT

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to windsock devices and more particularly pertains to a new windsock device for indicating a direction of wind.

BRIEF SUMMARY OF THE INVENTION

An embodiment of the disclosure meets the needs presented above by generally comprising a base that is mountable on a roof of a vehicle. An antenna is pivotally coupled to and extends upwardly from the base. A windsock is coupled to the antenna such that the windsock is exposed to wind to indicate a direction of the wind. A lighting unit is coupled to the antenna and the lighting unit emitting light outwardly from the antenna when the lighting unit is turned for illuminating an area proximate the antenna.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
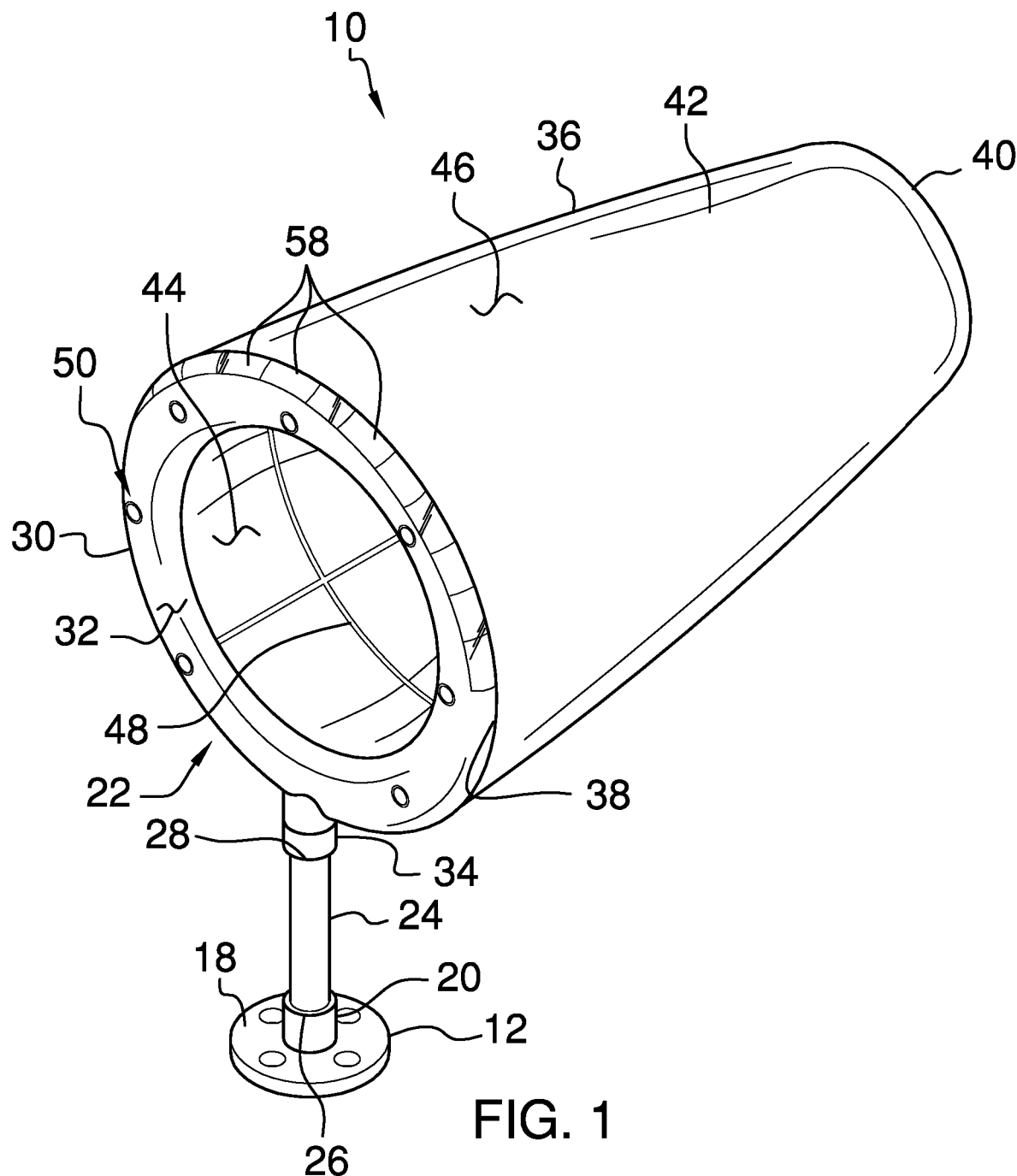
FIG. 1 is a front perspective view of a windsock assembly according to an embodiment of the disclosure.
Figure 2:
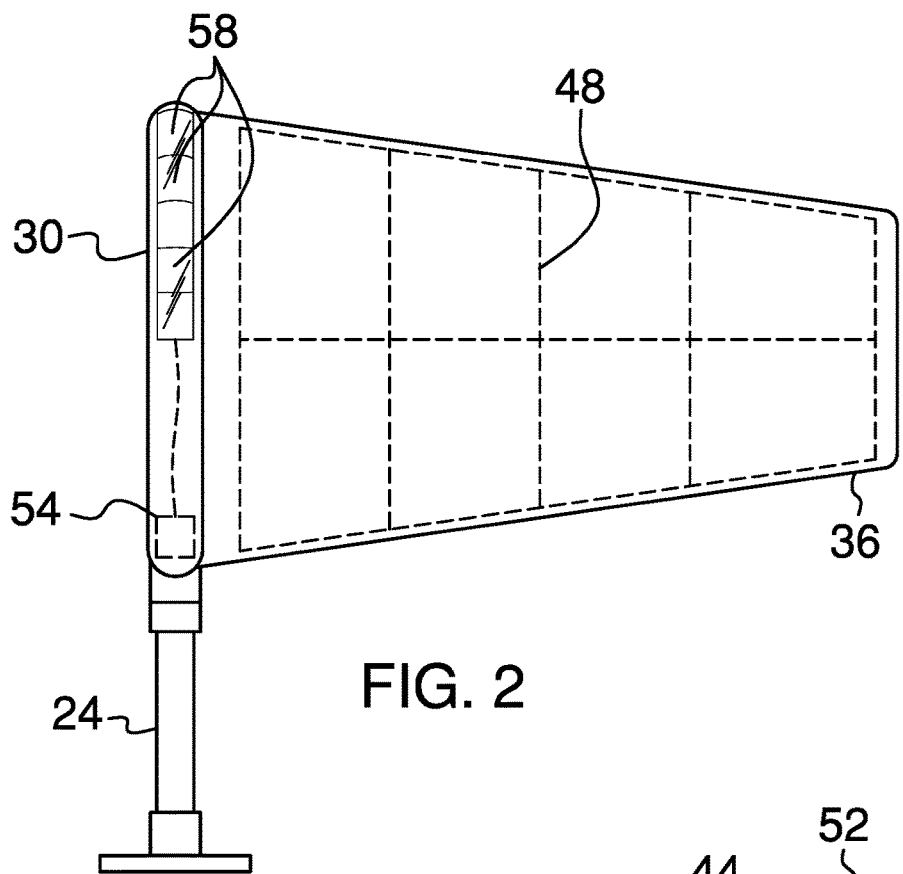
FIG. 2 is a right side phantom view of an embodiment of the disclosure.
Figure 3:
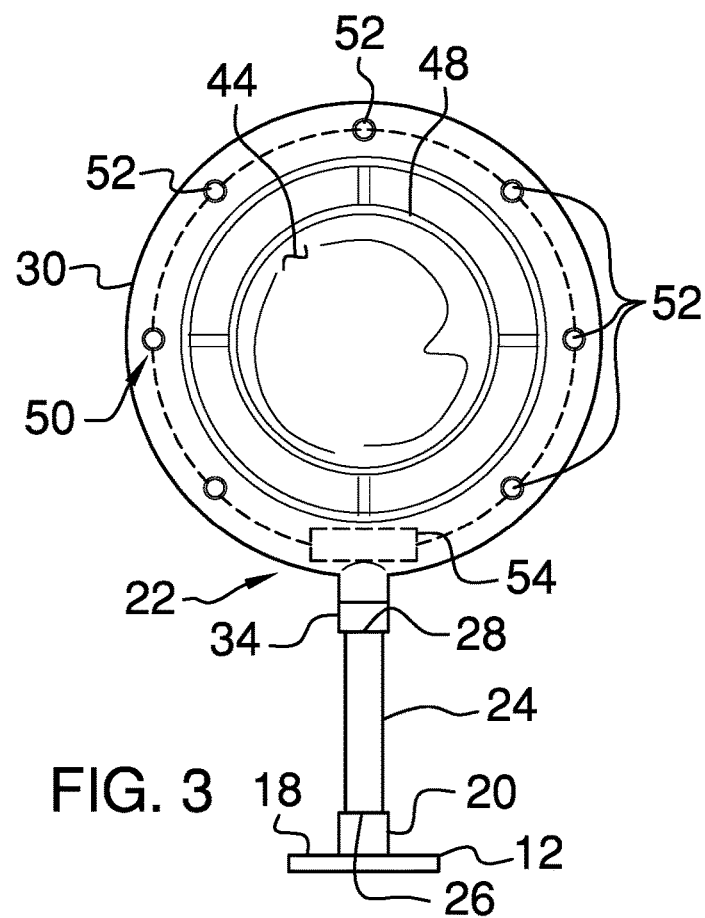
FIG. 3 is a front phantom view of an embodiment of the disclosure.
Figure 4:
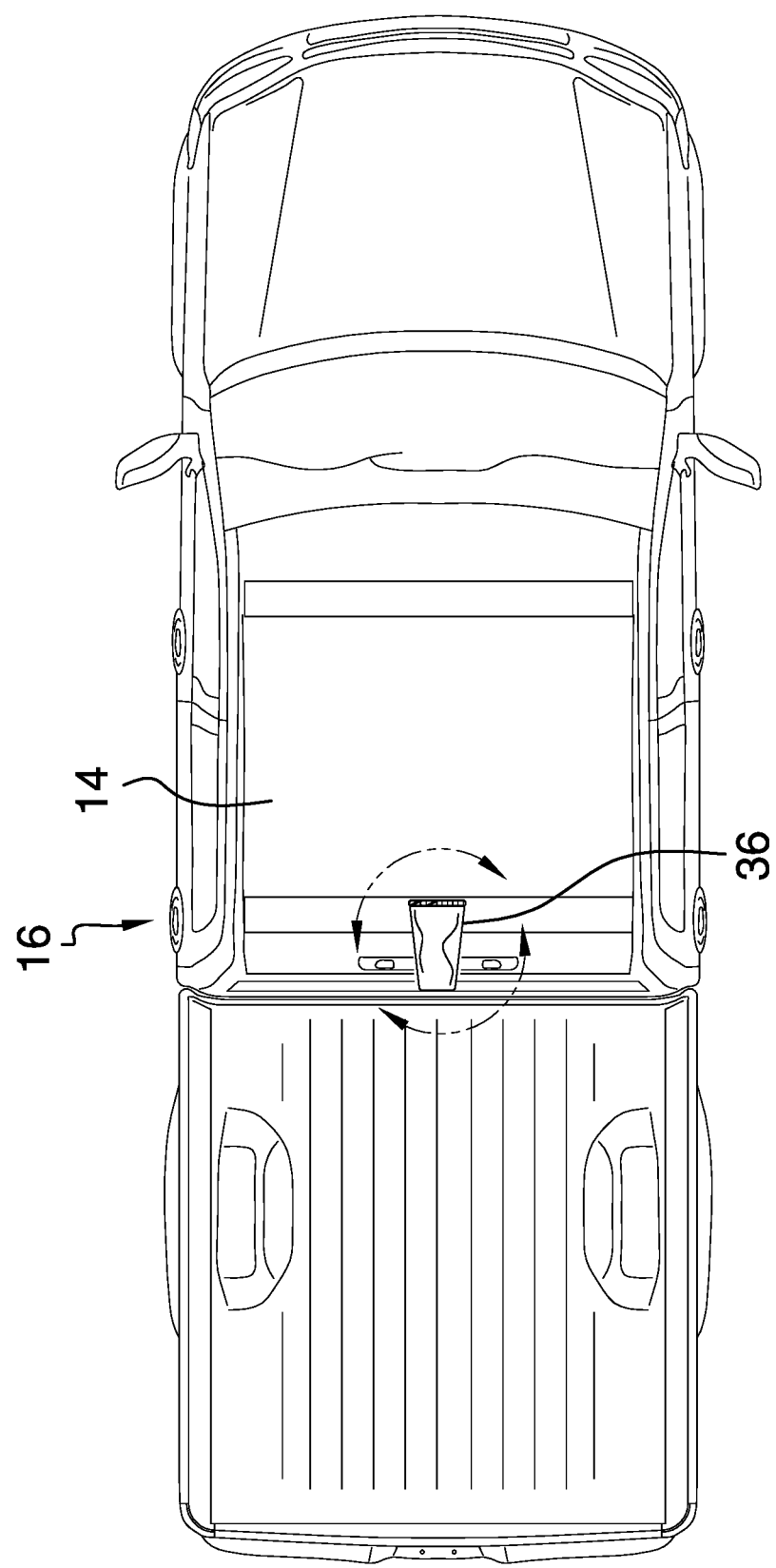
FIG. 4 is a top in-use view of an embodiment of the disclosure.

With reference now to the drawings, and in particular to FIGS. 1 through 7 thereof, a new windsock device embodying the principles and concepts of an embodiment of the disclosure and generally designated by the reference numeral 10 will be described.

As best illustrated in FIGS. 1 through 7, the windsock assembly 10 generally comprises a base 12 that is mountable on a roof 14 of a vehicle 16. The vehicle 16 may be a passenger vehicle such as a car or a pickup. The base 12 comprises a disk 18 and a cup 20 extending upwardly from the disk 18. The disk 18 is fastened to the roof 14 on the vehicle 16 with fasteners, such as screws or the like. An antenna 22 is pivotally coupled to and extends upwardly from the base 12. The antenna 22 comprises a shaft 24 that has a first end 26 and a second end 28. The cup 20 insertably receives the first end 26 having the shaft 24 being vertically oriented.

The antenna 22 includes a ring 30 has an outer surface 32 and a receiver 34 that is coupled to and extends downwardly from the outer surface 32 of the ring 30. The receiver 34 insertably receives the second end 28 of the shaft 24. Moreover, the ring 30 is oriented to lie on a plane that is oriented perpendicular to a line extending through the first end 26 and the second end 28 of the shaft 24. In this way the ring 30 is positioned to have wind blow therethrough. The ring 30 may have a diameter ranging between approximately 12.0 cm and 50.0 cm.

A windsock 36 is coupled to the antenna 22 such that the windsock 36 is exposed to wind. Thus, the windsock 36 engages the wind to swivel the ring 30 thereby indicating a direction of the wind. The windsock 36 has a primary end 38, a secondary end 40 and an outer wall 42 extending therebetween. The outer wall 42 tapers inwardly between the primary end 38 and the secondary end 40 such that the windsock 36 has the traditional, conical shape of airport windsocks. The primary end 38 is coupled to the outer surface 32 of the ring 30 and the outer wall 42 has an inside surface 44 and an outside surface 46. The outside surface 46 may have a variety of indicia printed thereon for ornamental purposes, and the windsock 36 may come in a variety of colors. A cage 48 is coupled to the inside surface 44 of the outer wall 42 of the windsock 36, and the cage 48 is comprised of a rigid material to urge the windsock 36 to be horizontally oriented.

A lighting unit 50 is coupled to the antenna 22 and the lighting unit 50 emits light outwardly from the antenna 22 when the lighting unit 50 is turned on. In this way the lighting unit 50 may illuminate an area proximate the antenna 22. The lighting unit 50 comprises a plurality of light emitters 52 that is each coupled to the outer surface 32 of the ring 30. The light emitters 52 are spaced apart from each other and are distributed around an entire circumference of the ring 30. Moreover, each of the light emitters 52 is oriented on the ring 30 to face forwardly from the ring 30, and each of the light emitters 52 may comprise an LED or the like.

A power supply 54 is coupled to the ring 30 and each of the light emitters 52 is electrically coupled to the power supply 54. The power supply 54 comprises at least one battery 56 that is positioned within the ring 30 and each of the light emitters 52 is electrically coupled to the at least one battery 56. A plurality of solar cells 58 is provided and each of the solar cells 58 is coupled to the outside surface 46 of the ring 30 such that each of the solar cells 58 is exposed to sunlight when the vehicle 16 is outdoors. Each of the solar cells 58 is electrically coupled to the at least one battery 56 for charging the at least one battery 56.

Figure 5:
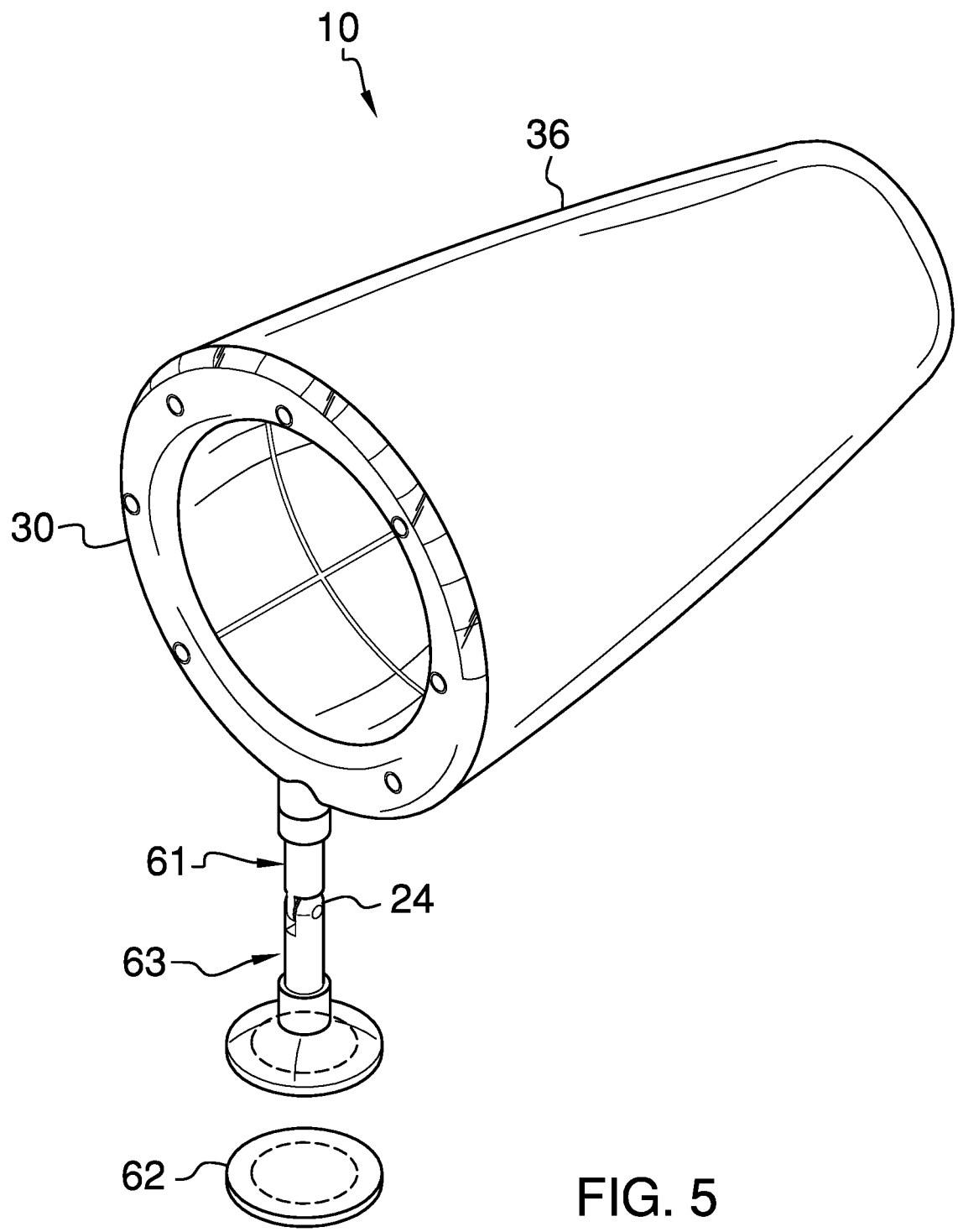
FIG. 5 is an exploded perspective view of an alternative embodiment of the disclosure.
Figure 6:
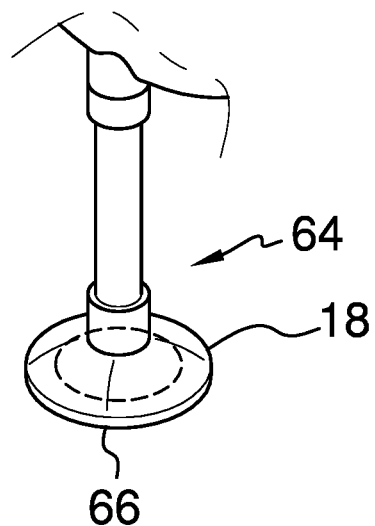
FIG. 6 is a perspective view of an alternative embodiment of the disclosure.
Figure 7:
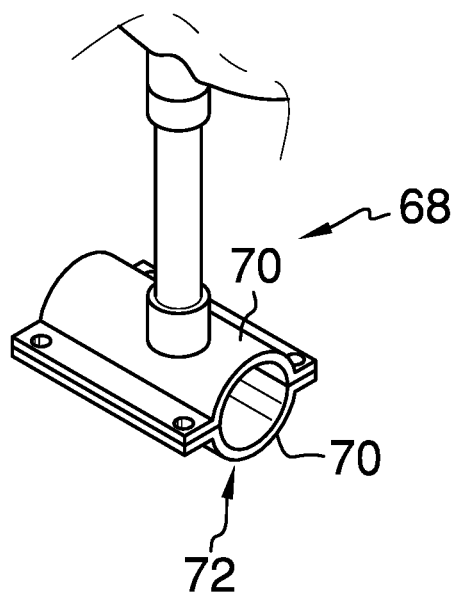
FIG. 7 is a front perspective view of an alternative embodiment of the disclosure.

In an alternative embodiment 60 as shown in FIG. 5, an adhesive disk 62 may be provided and the adhesive disk 62 may adhesively engage the roof 14 of the vehicle 16. The adhesive disk 62 may adhesively engage the base 12 when the base 12 is positioned on the adhesive disk 62 for coupling base 12 to the vehicle 16. Additionally, the shaft 24 may have a first half 61 that is pivotally coupled to a second half 63. In an alternative embodiment 64 as shown in FIG. 6, the disk 18 of the base 12 may have a bottom surface 66 and the bottom surface 66 may be concavely arcuate. Thus, the disk 18 may form a suction cup for suctionally engaging the roof 14 of the vehicle 16. In an alternative embodiment 68 as shown in FIG. 7, a pair of channels 70 may be coupled together to form a sleeve 72 that is coupled around a cylindrical support, such as a pipe or the like. The shaft 24 may be coupled to one of the channels 70 to facilitate the antenna 22 to be retained on the cylindrical support.

In use, the base 12 is fastened to the roof 14, or other body panel of the vehicle 16. The windsock 36 is horizontally oriented to capture wind. In this way the windsock 36 rotates the shaft 24 such that the windsock 36 is oriented to indicate a direction of the wind. Additionally, the light emitters 52 are selectively turned on to emit light outwardly from the ring 30 to enhance the ornamental appearance of the windsock 36 and the ring 30. The solar cells 58 continuously charge the at least one battery 56 while the solar cells 58 are exposed to sunlight.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A windsock assembly being configured to be mounted on a vehicle thereby facilitating said assembly to indicate a direction of wind, said assembly comprising:
    a base being mountable on a roof of a vehicle, said base comprising a disk and a cup extending upwardly from said disk, said disk being fastened to the roof on the vehicle;
    an antenna being pivotally coupled to and extending upwardly from said base, said antenna comprising
        a shaft having a first end and a second end, said cup insertably receiving said first end having said shaft being vertically oriented, and
        a ring having an outer surface;
    a windsock being coupled to said antenna such that said windsock is exposed to wind wherein said windsock is configured to indicate a direction of the wind; and
    a lighting unit being coupled to said antenna, said lighting unit emitting light outwardly from said antenna when said lighting unit is turned on wherein said lighting unit is configured to illuminate an area proximate said antenna, said lighting unit comprising a plurality of light emitters, each of said light emitters being coupled to said outer surface of said ring, said light emitters being spaced apart from each other end being distributed around an entire circumference of said ring, each of said light emitters being oriented on said ring to face forwardly from said ring.

2. The assembly according to claim 1, further comprising a receiver being coupled to and extending downwardly from said outer surface of said ring, said receiver insertably receiving said second end of said shaft such that said ring lies on the plane being oriented perpendicular to a line extending through said first end and said second end of said shaft wherein said ring is configured to have wind blow therethrough.

3. The assembly according to claim 2, wherein said windsock has a primary end, secondary end and an outer wall extending therebetween, said outer wall tapering inwardly between said primary end and said secondary end, said primary end being coupled to said outer surface of said ring, said outer wall having an inside surface.

4. The assembly according to claim 3, further comprising a cage being coupled to said inside surface of said outer wall of said windsock, said cage being comprised of a rigid material such that said cage urges said windsock to be horizontally oriented.

5. The assembly according to claim 1, further comprising a power supply being coupled to said ring, each of said light emitters being electrically coupled to said power supply.

6. The assembly according to claim 5, wherein said power supply comprises at least one battery being positioned within said ring, each of said light emitters being electrically coupled to said at least one battery.

7. The assembly according to claim 6, further comprising a plurality of solar cells, each of said solar cells being coupled to said outside surface of said ring wherein each of said solar cells is configured to be exposed to sunlight, each of said solar cells being electrically coupled to said at least one battery for charging said at least one battery.

8. A windsock assembly being configured to be mounted on a vehicle thereby facilitating said assembly to indicate a direction of wind, said assembly comprising:
- a base being mountable on a roof of a vehicle, said base comprising a disk and a cup extending upwardly from said disk, said disk being fastened to the roof on the vehicle;
- an antenna being pivotally coupled to and extending upwardly from said base, said antenna comprising:
  - a shaft having a first end and a second end, said cup insertably receiving said first end having said shaft being vertically oriented;
  - a ring having an outer surface; and
  - a receiver being coupled to and extending downwardly from said outer surface of said ring, said receiver insertably receiving said second end of said shaft such that said ring lies on the plane being oriented perpendicular to a line extending through said first end and said second end of said shaft wherein said ring is configured to have wind blow therethrough;
- a windsock being coupled to said antenna such that said windsock is exposed to wind wherein said windsock is configured to indicate a direction of the wind, said windsock having a primary end, secondary end and an outer wall extending therebetween, said outer wall tapering inwardly between said primary end and said secondary end, said primary end being coupled to said outer surface of said ring, said outer wall having an inside surface;
- a cage being coupled to said inside surface of said outer wall of said windsock, said cage being comprised of a rigid material such that said cage urges said windsock to be horizontally oriented; and
- a lighting unit being coupled to said antenna, said lighting unit emitting light outwardly from said antenna when said lighting unit is turned on wherein said lighting unit is configured to illuminate an area proximate said antenna, said lighting unit comprising:
  - a plurality of light emitters, each of said light emitters being coupled to said outer surface of said ring, said light emitters being spaced apart from each other end being distributed around an entire circumference of said ring, each of said light emitters being oriented on said ring to face forwardly from said ring; and
  - a power supply being coupled to said ring, each of said light emitters being electrically coupled to said power supply, said power supply comprising:
    - at least one battery being positioned within said ring, each of said light emitters being electrically coupled to said at least one battery; and
    - a plurality of solar cells, each of said solar cells being coupled to said outside surface of said ring wherein each of said solar cells is configured to be exposed to sunlight, each of said solar cells being electrically coupled to said at least one battery for charging said at least one battery.

\* \* \* \* \*